US010757216B1

(12) United States Patent
Van Vliet et al.

(10) Patent No.: US 10,757,216 B1
(45) Date of Patent: Aug. 25, 2020

(54) GROUP PROFILES FOR GROUP ITEM RECOMMENDATIONS

(71) Applicant: Amazon Technologies, Inc., Seattle, WA (US)

(72) Inventors: Scott Edward Van Vliet, Las Flores, CA (US); Jeremy Daniel Johnson, Mission Viejo, CA (US); Stefan K Yap, Brea, CA (US)

(73) Assignee: Amazon Technologies, Inc., Seattle, WA (US)

( * ) Notice: Subject to any disclaimer, the term of this patent is extended or adjusted under 35 U.S.C. 154(b) by 619 days.

(21) Appl. No.: 14/628,090

(22) Filed: Feb. 20, 2015

(51) Int. Cl.
*H04L 29/08* (2006.01)

(52) U.S. Cl.
CPC ............ *H04L 67/306* (2013.01); *H04L 67/10* (2013.01)

(58) Field of Classification Search
CPC .............................. H04L 67/306; H04L 67/10
See application file for complete search history.

(56) References Cited

U.S. PATENT DOCUMENTS

| | | | |
|---|---|---|---|
| 6,438,579 B1 * | 8/2002 | Hosken ............. | G06F 17/30867 707/999.002 |
| 6,675,384 B1 | 1/2004 | Block et al. | |
| 6,934,748 B1 * | 8/2005 | Louviere ................ | G06Q 30/02 709/224 |
| 7,640,272 B2 | 12/2009 | Mahajan et al. | |
| 7,644,400 B2 | 1/2010 | Harris et al. | |
| 7,751,909 B2 | 7/2010 | Ramsey et al. | |
| 8,079,042 B2 | 12/2011 | Foti et al. | |
| 8,218,080 B2 | 7/2012 | Xu et al. | |
| 8,301,770 B2 * | 10/2012 | van Coppenolle | .... G06Q 30/06 709/225 |
| 8,384,555 B2 | 2/2013 | Rosen | |
| 8,630,741 B1 | 1/2014 | Matsuoka et al. | |

(Continued)

FOREIGN PATENT DOCUMENTS

WO   2014026199   2/2014

OTHER PUBLICATIONS

Brassil, "Structuring Internet Media Streams with Cueing Protocols", IEEE/ACM Transactions on Networking, vol. 10, No. 4, Aug. 2002, pp. 466-476.

(Continued)

*Primary Examiner* — Philip J Chea
*Assistant Examiner* — Robert B McAdams
(74) *Attorney, Agent, or Firm* — Robert C. Kowert; Kowert, Hood, Munyon, Rankin & Goetzel, P.C.

(57) ABSTRACT

A network-based enterprise or other system that makes items available for selection to users may implement group profiles for group item recommendations. A request for item recommendations offered via the network-based enterprise may be received. Multiple user accounts of the network-based enterprise may be detected as associated with the request. A group profile that includes the detected user accounts may be identified. Group profiles may maintain behavioral data for the respective user accounts included in the group profiles, as well as behavioral data for the group profile as a whole. Item recommendations may be generated according to the group profile and provided to the detected users. Group profiles may available across multiple systems and devices so that item recommendations based on a group profile may be provided to different systems.

20 Claims, 7 Drawing Sheets

(56) References Cited

U.S. PATENT DOCUMENTS

| | | |
|---|---|---|
| 8,768,314 B2 | 7/2014 | Chien |
| 8,789,147 B1 | 7/2014 | Agarwal et al. |
| 8,798,323 B2 | 8/2014 | Soderstrom |
| 8,914,837 B2 | 12/2014 | Ahmed et al. |
| 8,918,903 B1 | 12/2014 | Schepis et al. |
| 8,934,748 B2 | 1/2015 | Rice et al. |
| 9,241,187 B2 | 1/2016 | Ricci |
| 9,288,387 B1 | 3/2016 | Keller |
| 9,729,551 B1 | 8/2017 | Karunakaran |
| 2003/0034877 A1 | 2/2003 | Miller et al. |
| 2003/0036967 A1 | 2/2003 | Deguchi |
| 2003/0066071 A1 | 4/2003 | Gutta, Sr. |
| 2003/0100315 A1 | 5/2003 | Rankin |
| 2004/0003392 A1 | 1/2004 | Trajkovic et al. |
| 2004/0054923 A1 | 3/2004 | Seago et al. |
| 2004/0081144 A1 | 4/2004 | Martin et al. |
| 2005/0060157 A1* | 3/2005 | Daugherty ............ G06F 21/32 704/273 |
| 2005/0097559 A1 | 5/2005 | Lipsanen et al. |
| 2005/0097595 A1 | 5/2005 | Lipsanen et al. |
| 2006/0005256 A1 | 1/2006 | Cox |
| 2006/0023915 A1 | 2/2006 | Aalbu et al. |
| 2006/0087554 A1 | 4/2006 | Boyd et al. |
| 2007/0122111 A1 | 5/2007 | Yamamoto et al. |
| 2007/0126884 A1 | 6/2007 | Xu et al. |
| 2007/0162971 A1 | 7/2007 | Blom et al. |
| 2007/0180485 A1 | 8/2007 | Dua |
| 2007/0213100 A1 | 9/2007 | Osann, Jr. |
| 2008/0109307 A1 | 5/2008 | Ullah |
| 2008/0133334 A1* | 6/2008 | Ullah .................. G06Q 30/02 705/7.29 |
| 2008/0141293 A1 | 6/2008 | Blachard et al. |
| 2008/0146194 A1 | 6/2008 | Yang et al. |
| 2008/0160984 A1 | 7/2008 | Benes et al. |
| 2008/0214145 A1 | 9/2008 | Howard et al. |
| 2008/0235739 A1 | 9/2008 | Coebergh Van Den Braak |
| 2009/0044225 A1 | 2/2009 | Lin et al. |
| 2009/0125971 A1 | 5/2009 | Belz et al. |
| 2009/0133051 A1 | 5/2009 | Hildreth |
| 2009/0138805 A1 | 5/2009 | Hildreth |
| 2009/0217356 A1 | 8/2009 | Scott et al. |
| 2009/0262388 A1 | 10/2009 | Park |
| 2009/0285492 A1 | 11/2009 | Ramanujapuram et al. |
| 2009/0298514 A1 | 12/2009 | Ullah |
| 2010/0080414 A1 | 4/2010 | Nonaka |
| 2010/0130182 A1 | 5/2010 | Rosen |
| 2010/0180009 A1 | 7/2010 | Callahan |
| 2010/0190481 A1 | 7/2010 | Nath et al. |
| 2010/0199105 A1 | 8/2010 | Lee |
| 2010/0250327 A1* | 9/2010 | Relyea, Jr. ............ G06Q 30/02 705/14.53 |
| 2010/0262712 A1 | 10/2010 | Kim et al. |
| 2010/0268821 A1 | 10/2010 | Pau et al. |
| 2011/0003582 A1 | 1/2011 | Park et al. |
| 2011/0022447 A1 | 1/2011 | Pelaic |
| 2011/0062794 A1 | 3/2011 | Vergoossen et al. |
| 2011/0125777 A1 | 5/2011 | Begeja et al. |
| 2011/0141114 A1 | 6/2011 | Chen et al. |
| 2011/0207440 A1 | 8/2011 | Ruuspakka et al. |
| 2011/0237324 A1 | 9/2011 | Clavin et al. |
| 2011/0320380 A1 | 12/2011 | Zahn et al. |
| 2012/0060176 A1 | 3/2012 | Chai et al. |
| 2012/0071132 A1 | 3/2012 | Carlander |
| 2012/0246343 A1 | 9/2012 | Story, Jr. et al. |
| 2012/0280901 A1 | 11/2012 | Kim |
| 2012/0311723 A1 | 12/2012 | Britt, Jr. et al. |
| 2012/0322429 A1 | 12/2012 | Chien |
| 2013/0007874 A1* | 1/2013 | Purvis .................. G06F 21/32 726/19 |
| 2013/0130669 A1 | 5/2013 | Xiao et al. |
| 2013/0157607 A1 | 6/2013 | Paek et al. |
| 2013/0174223 A1 | 7/2013 | Dykeman et al. |
| 2013/0218905 A1 | 8/2013 | Sankarasubramaniam et al. |
| 2013/0246452 A1 | 9/2013 | Vadrevu et al. |
| 2013/0339991 A1 | 10/2013 | Ricci |
| 2013/0297706 A1 | 11/2013 | Arme et al. |
| 2013/0298216 A1 | 11/2013 | Kuznetsov |
| 2013/0318573 A1 | 11/2013 | Reunamaki et al. |
| 2013/0325655 A1 | 12/2013 | Wouhaybi et al. |
| 2013/0343364 A1 | 12/2013 | Fuller |
| 2014/0026201 A1 | 1/2014 | Srinivasan et al. |
| 2014/0041000 A1 | 2/2014 | Rolfe |
| 2014/0053212 A1 | 2/2014 | Shoykher et al. |
| 2014/0068645 A1 | 3/2014 | Badros et al. |
| 2014/0082208 A1 | 3/2014 | Ojanpera |
| 2014/0096180 A1 | 4/2014 | Negi et al. |
| 2014/0130073 A1 | 5/2014 | Yu et al. |
| 2014/0173051 A1 | 6/2014 | Sagayaraj et al. |
| 2014/0181910 A1 | 6/2014 | Fingal et al. |
| 2014/0201816 A1 | 7/2014 | Brannon |
| 2014/0223467 A1 | 8/2014 | Hayton et al. |
| 2014/0232903 A1 | 8/2014 | Oshima et al. |
| 2014/0267906 A1 | 9/2014 | Mickelsen et al. |
| 2014/0359647 A1 | 12/2014 | Shoemake et al. |
| 2014/0372228 A1 | 12/2014 | Paz-Pujalt |
| 2015/0020097 A1* | 1/2015 | Freed ................... H04N 21/812 725/35 |
| 2015/0058393 A1 | 2/2015 | Smith et al. |
| 2015/0067714 A1 | 3/2015 | Bhogal et al. |
| 2015/0074800 A1 | 3/2015 | Farraro |
| 2015/0113631 A1 | 4/2015 | Lerner et al. |
| 2015/0147968 A1 | 5/2015 | Friedman et al. |
| 2015/0156192 A1 | 6/2015 | Yang et al. |
| 2015/0177939 A1 | 6/2015 | Anderson et al. |
| 2015/0180880 A1 | 6/2015 | Nakano et al. |
| 2015/0195675 A1 | 7/2015 | Larkin et al. |
| 2015/0213238 A1 | 7/2015 | Farha |
| 2015/0281767 A1 | 10/2015 | Adimatyam et al. |
| 2015/0327068 A1 | 11/2015 | Hunt et al. |
| 2016/0005012 A1 | 1/2016 | Goetz et al. |
| 2016/0036939 A1* | 2/2016 | Freund ................. H04L 67/306 709/204 |
| 2016/0044385 A1 | 2/2016 | Kareeson et al. |
| 2016/0088358 A1 | 3/2016 | Garcia Navarro |
| 2016/0099950 A1 | 4/2016 | Cuff et al. |
| 2016/0112429 A1 | 4/2016 | Sundaresan et al. |
| 2016/0121161 A1 | 5/2016 | Mountain |
| 2016/0142783 A1 | 5/2016 | Bagga et al. |
| 2016/0173929 A1 | 6/2016 | Klappert et al. |
| 2016/0182502 A1 | 6/2016 | Smith et al. |
| 2016/0182658 A1 | 6/2016 | Allinson et al. |
| 2016/0205344 A1 | 7/2016 | Suzuki et al. |
| 2017/0372228 A1 | 12/2017 | Daly et al. |

OTHER PUBLICATIONS

McGill, How to Lose Friends & Alienate People: Sharing Control on a Single-User TV System:, TVX, Jun. 25-27, 2014, pp. 147-154.

Dedrick, "Interactive Electronic Advertising", IEEE, 1994, pp. 55-66.

U.S. Appl. No. 14/637,175, filed Mar. 3, 2015, Scott Edward Van Vliet et al.

* cited by examiner

GROUP PROFILES FOR GROUP ITEM RECOMMENDATIONS

BACKGROUND

Consumer choices for goods and services have grown exponentially upon the advent of the digital age. E-commerce, content distribution networks, and other communication technologies have enabled customers to choose from many more goods than were previously available to them. However, navigating the sheer number products now available can prove daunting and ultimately discourage some customers from making purchases using these new means. Recommendation systems have been developed in order to provide customers with some assistance when choosing new products. A recommendation system may provide feedback or recommended items to a customer so that the customer may make a more informed decision as to whether or not an item may be a good purchase.

In order to create effective item recommendation systems, large amounts of past behavior of customers may be tracked and maintained. This customer data may be maintained according to a particular user account or user profile and analyzed in order to make suggestions of items that, for example, other similar customers have purchased. In order to provide good item recommendations, however, customer data may need to be accurately attributed to the correct user account. However, some fulfillment systems or services may be susceptible to inaccurate attribution as it may depend upon a user to ensure that the correct user account is identified. Moreover, in scenarios where multiple users may utilize a common system or device to make purchases, selections, or provide other behavioral input that is tracked, accurate attribution of tracked data may be difficult when multiple users may utilize a system at a same time.

Figure 1:
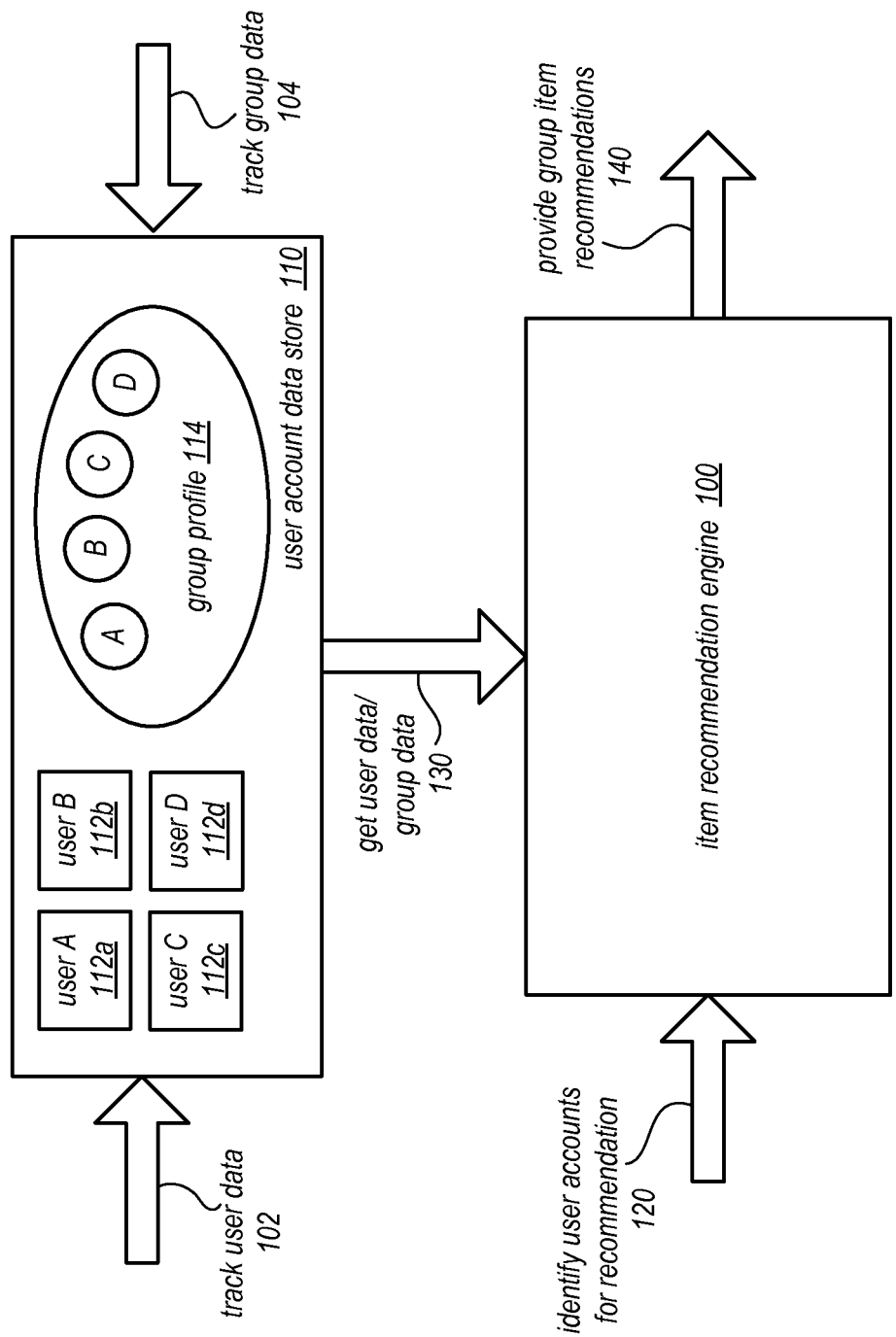
FIG. 1 is a logical block diagram illustrating an item recommendation engine utilizing group profiles for group item recommendations, according to some embodiments.

While embodiments are described herein by way of example for several embodiments and illustrative drawings, those skilled in the art will recognize that the embodiments are not limited to the embodiments or drawings described. It should be understood, that the drawings and detailed description thereto are not intended to limit embodiments to the particular form disclosed, but on the contrary, the intention is to cover all modifications, equivalents and alternatives falling within the spirit and scope as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). The words "include," "including," and "includes" indicate open-ended relationships and therefore mean including, but not limited to. Similarly, the words "have," "having," and "has" also indicate open-ended relationships, and thus mean having, but not limited to. The terms "first," "second," "third," and so forth as used herein are used as labels for nouns that they precede, and do not imply any type of ordering (e.g., spatial, temporal, logical, etc.) unless such an ordering is otherwise explicitly indicated.

Various components may be described as "configured to" perform a task or tasks. In such contexts, "configured to" is a broad recitation generally meaning "having structure that" performs the task or tasks during operation. As such, the component can be configured to perform the task even when the component is not currently performing that task (e.g., a computer system may be configured to perform operations even when the operations are not currently being performed). In some contexts, "configured to" may be a broad recitation of structure generally meaning "having circuitry that" performs the task or tasks during operation. As such, the component can be configured to perform the task even when the component is not currently on. In general, the circuitry that forms the structure corresponding to "configured to" may include hardware circuits.

Various components may be described as performing a task or tasks, for convenience in the description. Such descriptions should be interpreted as including the phrase "configured to." Reciting a component that is configured to perform one or more tasks is expressly intended not to invoke 35 U.S.C. § 112(f), interpretation for that component.

"Based On." As used herein, this term is used to describe one or more factors that affect a determination. This term does not foreclose additional factors that may affect a determination. That is, a determination may be solely based on those factors or based, at least in part, on those factors. Consider the phrase "determine A based on B." While B may be a factor that affects the determination of A, such a phrase does not foreclose the determination of A from also being based on C. In other instances, A may be determined based solely on B.

The scope of the present disclosure includes any feature or combination of features disclosed herein (either explicitly or implicitly), or any generalization thereof, whether or not it mitigates any or all of the problems addressed herein. Accordingly, new claims may be formulated during prosecution of this application (or an application claiming priority thereto) to any such combination of features. In particular, with reference to the appended claims, features from dependent claims may be combined with those of the independent claims and features from respective independent claims may be combined in any appropriate manner and not merely in the specific combinations enumerated in the appended claims.

DETAILED DESCRIPTION

Various embodiments of group profiles for group recommendations are described herein. User accounts (or user profiles) may provide a point of organization for different systems, services, and/or devices, such as a network-based enterprise, that provide items for purchase, rent, or use. Different content (e.g., audio, visual, interactive, etc.) is one such example of items that may be provided to a user. Different rights, authorizations, agreements, controls, settings, and other information used to purchase, rent, or use items may be associated with particular user accounts. For example, with regard to a network-based enterprise that provides content for access, a content consumption device (e.g., a content streaming device or other device that obtains and makes content available to a user) may provide content access to a user according to settings in a user account (e.g., payment information or ratings restrictions). Additionally, various user experience optimizations may be implemented based on information, such as historical behavioral data associated with a user account, in order to provide item recommendations and other tailored information to a user.

Sometimes, multiple different users may access, purchase, rent, or interact with offered items. For example, a single content consumption device implemented as part of an entertainment system, displaying audio, visual, and interactive content via a display (e.g., a television) may be utilized by multiple different users at the same time. Respective user accounts may be setup for the different users. However, typically, only a single user may be logged into or control the content consumption device at a time. Thus, users may have to switch user accounts at the content consumption device in order to obtain information relevant to the particular user. Nor will the information provided for a single user be necessarily relevant to the group of users utilizing the content consumption device. Moreover, group selections that would have been chosen, accessed, viewed, etc. by multiple users may not be recorded in the respective user behavior history for all users. Group profiles for group recommendations may be implemented to provide relevant information, such as item recommendations tailored to a group of users.

FIG. 1 is a logical block diagram illustrating an item recommendation engine utilizing group profiles for group item recommendations, according to some embodiments. Item recommendation engine 100 may be configured to perform various different recommendation techniques (e.g., content-based filtering, collaborative-based filtering, or a hybrid recommendation approach). As illustrated in FIG. 1, multiple user accounts may be identified 120 to item recommendation engine 100 in order to make item recommendations. For example, as discussed below with regard to FIGS. 2 and 5, various different detection techniques may be implemented to automatically detect user accounts and/or manually detect user accounts. Based on the identified user accounts, a group profile may be identified. As illustrated in FIG. 1, user account data store 110 may persistently maintain behavioral and other account data (e.g., settings, rights, restrictions, etc.) specific to different users, such as user A 112a, user B 112b, user C 112c, and user D 112d. This behavioral data may be tracked over time 102 based on the actions of users associated with the respective user accounts 112. Group profiles may also be maintained in user account data store 110, such as group profile 114. User accounts included in a group profile may be identified, such as user A, user B, user C, and user D. Similar to users, group data 104 may be tracked over time updating behavioral data maintained for the group profile. Thus, in various embodiments group profiles may include individual user account behavioral data and behavioral data with respect to the whole group profile (e.g., actions performed while a group profile is loaded/identified/recognized).

Item recommendation engine 100 may get user data and group data 130 for the identified group profile in order to generate item recommendations. Item recommendations may be offers for physical items, virtual or digital consumable items, or services which may be provided to a user or group of users. Different recommendation techniques may be performed to generate the item recommendations, such as by comparing individual user behavioral data in the group to predict common item preferences. In some embodiments, user account settings or other data different than behavioral data may be used to modify or adjust item recommendations. For example, in some embodiments, a ratings restriction for one user account may be applied to all recommendations provided for a group profile. Generating item recommendations according to group profiles may provide item recommendations that are tailored or relevant to a group of users rather than any one individual user. Once the group item recommendations are generated, they may be provided 140. For example, the item recommendations may be sent to and/or displayed at a content consumption device for user browsing. Group item recommendations may also be provided as a data set or source for various different applications which may be associated with user accounts included in a group profile. The associated applications may request recommendations for particular types of items, such as digital content (e.g., audio, video, or interactive content) or services (e.g., entertainment services such as dining offers, concerts, shows, recreation opportunities, etc.).

Please note, FIG. 1 is provided as an example illustration of an item recommendation engine utilizing group profiles, and is not intended to be limiting as to the physical arrangement, size, or number of components, modules, or devices, implementing group profiles for group recommendations or a user account data store.

The specification next describes an example content consumption device which may implement group profiles for group recommendations and a network-based enterprise which may implement group profiles for group recommendations and which may also provide items, such as content for the content consumption device. The specification then describes various flowcharts for implementing different techniques to provide group profiles for group recommendations. An example computer system upon which the described systems, devices, and techniques may be implemented is then described.

Figure 2:
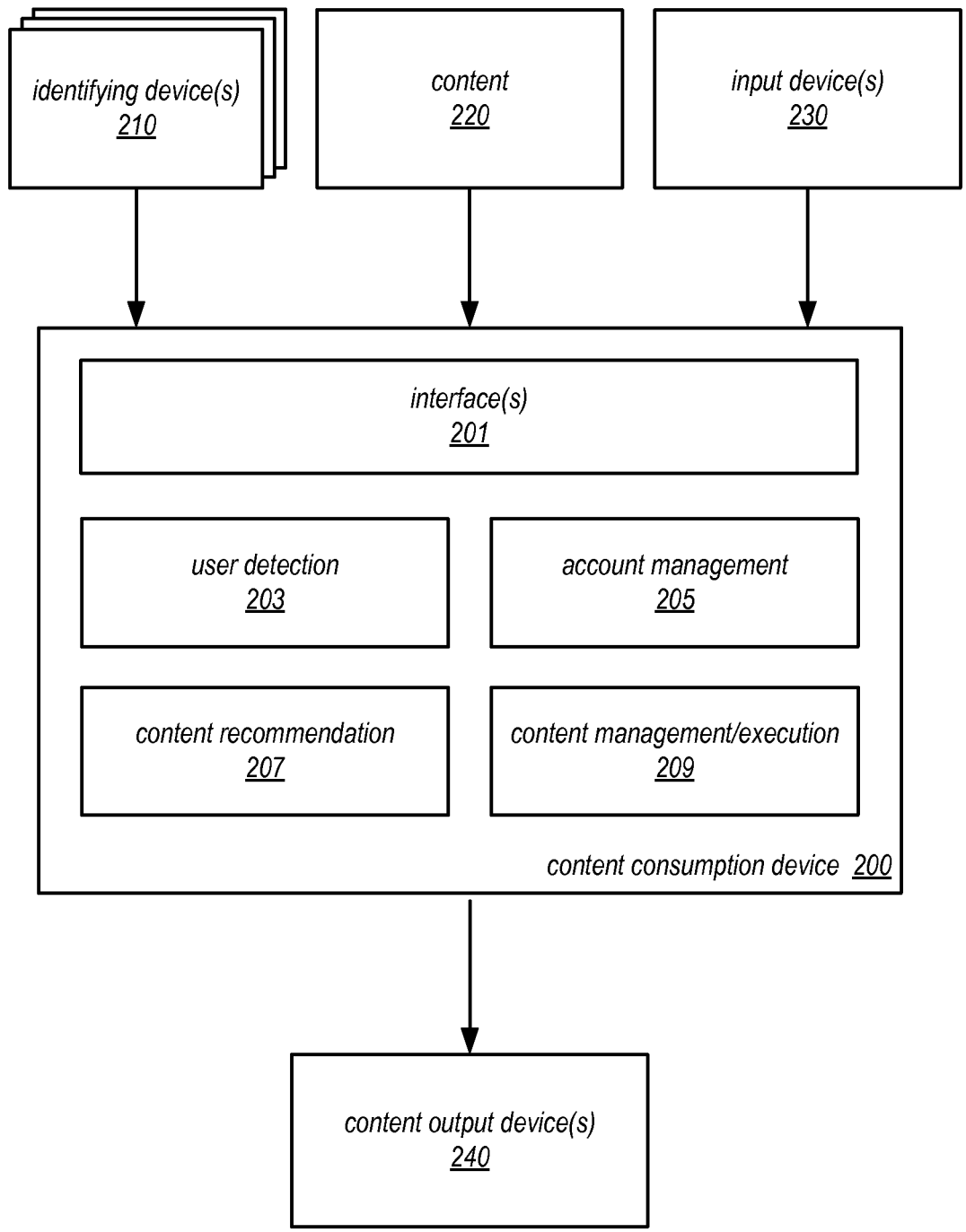
FIG. 2 is a logical block diagram illustrating a content consumption system which may detect multiple users and provide group item recommendations, according to some embodiments.

FIG. 2 is a logical block diagram illustrating a content consumption system, according to some embodiments. Content consumption device 200 may be implemented in hardware and/or software on one or more computing devices, such as computing system 1000 described below with regard to FIG. 7. Content consumption device 200 may implement one or more interface(s) 201, which may allow communication according to different protocols, technologies, or mediums. For example, identifying device(s) 210 may communicate via various types of radio wave communication protocols and techniques (e.g., Bluetooth, Bluetooth Low Energy (BLE), Z-Wave, ZigBee, XBee), infrared communications, Wi-Fi communications, or any other Wireless Personal Area Network (WPAN) communications may be utilized to provide device information between identifying devices and a content consumption device. Respective interface(s) 201 may be configured to receive the communications from identifying device(s) 210. Similarly, in some embodiments, content 220 may be stored external to content consumption device 200 (although in some embodiments it may be locally stored). Interface(s) 210 may be configured to access and/or receive content 220 (e.g., over a network connection). Input device(s) 230 may also provide information via interface(s) 201, such as remote control sending infrared signals, HTML-based requests over a network connection, or any other type of input (including wired inputs, such as keyboards, mice, other I/O devices).

In some embodiments, content consumption device 200 may implement user detection module 203 which may be configured to detect users who wish to consume content via content consumption device 200. For instance, an identifying device 210 may be a device configured to provide device information which may be received as one or more wireless communications at content consumption device 200 via interface 201. For example, identifying device 210 may broadcast device information including a device identifier via a radio protocol such as Bluetooth Low Energy (BLE). Based on the device information, content consumption device 200 may be configured to determine whether identifying device 210 is within consumption proximity of content consumption device 200. Consumption proximity may, in various embodiments, identify a location, area, or range in which content may be consumed. For instance, consumption proximity may be the area, such as room in which detection enabled content consumption device 200 is located, and in which a user, such as a user wearing identifying device 210 may be able to see visual content displayed at content consumption device 200. Identifying devices, such as identifying devices 210, may serve as a proxy for the presence of a user in various embodiments. Determining that an identifying device is within consumption proximity may allow a content consumption system to determine that a particular user is present and able to consume content. For example, a distance between identifying device 210 and content consumption device 200 may be determined and compared within one or more locality rules, which may describe distances which are considered to be within consumption proximity. Other user detection techniques may be implemented. For example, voice signature recognition, or other audio based recognition may be performed, matching voice input data (e.g., via an audio input device in interface 201) to specific user accounts (which may have voice signatures or voice identities accessible for comparison). In some embodiments, camera recognition techniques may be implemented to receive image data (e.g., via input device(s) 230 (such as a camera)) and perform camera recognition techniques to match users visible to content consumption device 200 with user accounts. Input device(s) 230 may provide for manual entry of user identifying information, in some embodiments.

In some embodiments, content consumption device 200 may implement account management module 205 to manage user account operations (e.g., creation, changes, or deletion). Account management module 205 may also be configured to create, modify, and/or delete group profiles, in some embodiments. In some embodiments, content consumption device 200 may implement content recommendation module 207 to prove content recommendations specific to a user account or a group of detected users according to a group profile, such as discussed above with regard to FIG. 1. Anonymous or local user accounts may be implemented, in some embodiments, allowing user accounts associated with a group profile (or individually) to remain local to interactions with content consumption device 200 (as opposed to making the anonymous or local user account data available to a network-based, enterprise, such as network-based enterprise 300). In some embodiments, some or all of account management 205 and content recommendation 207 functionalities may be provided by a content service, such as network-based enterprise 300 in FIG. 3. In some embodiments, content consumption device 200 may implement content management/execution module 209 to provide access to content according to a selected user account (e.g., enforcing account restrictions, request content recommendations, etc. . . . ). In some embodiments, content management/execution module 209 may obtain and provide content to content output devices 240 for consumption. Content output devices 240 may be, in some embodiments, audio, visual, and or interactive output devices.

Figure 3:
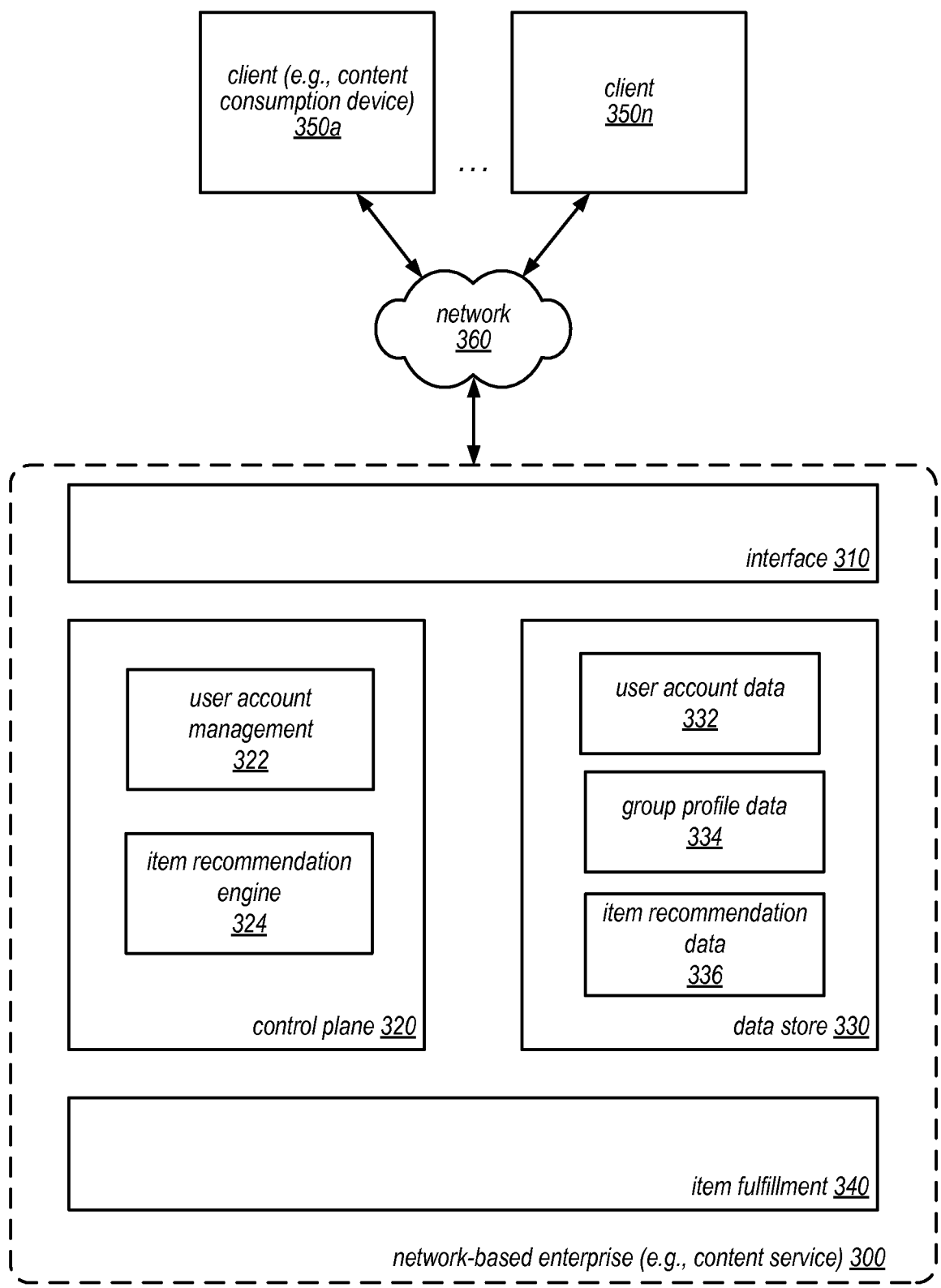
FIG. 3 is a logical block diagram illustrating a network-based enterprise implementing user accounts detected via device-enabled identification for automated user detection at content consumption devices, according to some embodiments.

The systems described herein may, in some embodiments, implement a network-based enterprise that offers items to customers or clients (which may be users). Items may be physical items (e.g., books, clothes, electronics, perishable goods, etc.) virtual or digital consumable items (e.g., media content, such as audio, video, games, or other interactive content), or services (e.g., transportation, entertainment, repair, installation, construction, etc.) which may be offered and/or provided to users via network-based enterprise 300. The items may be used, purchased, rented, or otherwise consumed. Selection of items may correspond to one of these actions and/or rating or reviewing particular item. Some embodiments of a network-based enterprise are illustrated in FIG. 3. In the illustrated embodiment, a number of clients (shown as clients 350a-350n) may be configured to interact with a network-based enterprise 300 via a network 360. Clients may be content consumption device(s) in some embodiments. An interface (e.g., a network-based site, such as a website, and/or a programmatic interface, such as may be programmatically accessible to a content consumption device) 310 may handle or communicate with clients 350. Control plane 320 may be configured to handle processing, management, and other techniques necessary to provide the requested content to clients 350. Data store 330 may maintain information for the network-based enterprise 300. Item fulfillment 340 may be either the physical or digital resources (content) provided to clients 350 upon selection. It is noted that where one or more instances of a given component may exist, reference to that component herein may be made in either the singular or the plural. However, usage of either form is not intended to preclude the other.

In various embodiments, the components illustrated in FIG. 3 may be implemented directly within computer hardware, as instructions directly or indirectly executable by computer hardware (e.g., a microprocessor or computer system), or using a combination of these techniques. For example, the components of FIG. 3 may be implemented by a system that includes a number of computing nodes (or simply, nodes), each of which may be similar to the computer system embodiment illustrated in FIG. 7 and described below. In various embodiments, the functionality of a given system component (e.g., content recommendation engine 324) may be implemented by a particular node or may be distributed across several nodes. In some embodiments, a given node may implement the functionality of more than one system component (e.g., more than control plane 320 component).

Generally speaking, clients 350 may encompass any type of client or other component configurable to submit network-based requests to network-based enterprise 300 via network 360, including requests to request, view, consume, purchase, reserve, or otherwise interact with items offered via network-based enterprise 300. In some embodiments, clients may receive and consume content directly (without a content consumption device). For example, a given client 350 may include a suitable version of a web browser, or may include a plug-in module or other type of code module configured to execute as an extension to or within an execution environment provided by a web browser. For example, selection of item for purchase and submitting payment information may be conveyed via the web browser. Alternatively, a client 350 (e.g., a gaming client) may encompass a content consumption device, configured to perform various interactions as described below in FIG. 4. In some embodiments, such a content consumption device may include sufficient protocol support (e.g., for a suitable version of Hypertext Transfer Protocol (HTTP)) for generating and processing network-based requests without necessarily implementing full browser support for all types of network-based data. That is, client 350 may interact directly with network-based enterprise 300 (or interface 310). In some embodiments, client 350 may be configured to generate network-based requests according to a Representational State Transfer (REST)-style network-based architecture, a document- or message-based network-based architecture, or another suitable network-based architecture.

Clients 350 may convey network-based requests (e.g., item selection requests, item recommendation requests, user account or group profile management requests, device registration requests, etc.) to and receive responses from network-based enterprise 300 via network 360. In various embodiments, network 360 may encompass any suitable combination of networking hardware and protocols necessary to establish network-based-based communications between client 350 and network-based enterprise 300 (and/or enterprise interface 310). For example, network 360 may generally encompass the various telecommunications networks and service providers that collectively implement the Internet. Network 360 may also include private networks such as local area networks (LANs) or wide area networks (WANs) as well as public or private wireless networks. For example, both a given client 350 and network-based enterprise 300 may be respectively provisioned within enterprises having their own internal networks. In such an embodiment, network 360 may include the hardware (e.g., modems, routers, switches, load balancers, proxy servers, etc.) and software (e.g., protocol stacks, accounting software, firewall/security software, etc.) necessary to establish a networking link between given client 350 and the Internet as well as between the Internet and network-based enterprise 300. It is noted that in some embodiments, client 350 may communicate with network-based enterprise 300 using a private network rather than the public Internet. For example, client 350 may via a private network as part of selecting and receiving digital items offered by network-based enterprise 300. In such a case, clients 350 may communicate with service 300 entirely through a private network 360 (e.g., a LAN or WAN that may use Internet-based communication protocols but which is not publicly accessible).

Generally speaking, network-based enterprise 300 may be configured to implement interface 310 which may be configured to receive and process network-based requests, such as requests to select, browse, access, or otherwise interact with items offered, retrieve items, access user account or group profile data, and/or get item recommendations. For example, interface 310 may include hardware and/or software configured to implement a network-based site, such that a web browser or other component implemented on client 350 may be configured to receive information via the network-based site. In some embodiments, interface 310 may include an Application Programming Interface, which may allow a client 350, such as a content consumption device, to programmatically communicate with network-based enterprise 310, such as described below with regard to FIG. 4. Interface 310 may be implemented as a server system configured to receive network-based requests from clients 350 and to forward them to components of a system, such as control plane 320, that facilitate the offering, sale, distribution or other functionalities of the items offered by network-based enterprise 300. In other embodiments, interface 310 may be configured as a number of distinct systems (e.g., in a cluster topology) implementing load balancing and other request management features configured to dynamically manage large-scale network-based request processing loads. In various embodiments, interface 310 may be configured to support REST-style or document-based (e.g., SOAP-based) types of network-based requests.

Control plane 320 may be configured to facilitate the operations of network-based enterprise 300. For example, control plane 320 may coordinate the purchase, rental, access, sharing, metering and/or accounting of client usage/selection of content, which may be services, physical products, or digital media, in various embodiments. In at least some embodiments, network-based enterprise 300 may be a streaming content service (e.g. streaming audio or video content). Control plane 320 may implement financial accounting and billing systems, or may maintain a database of usage data that may be queried and processed by external systems for reporting and billing of customer activity. In certain embodiments, control plane 320 may be configured to collect, monitor and/or aggregate a variety of operational metrics, such as metrics reflecting the rates and types of requests received from customers 350, bandwidth utilized by such requests, system processing latency for such requests, system component utilization (e.g., network bandwidth and/or storage utilization within the storage service system), rates and types of errors resulting from requests or any other suitable metrics. In some embodiments such metrics may be used by system administrators to tune and maintain system components, while in other embodiments such metrics (or relevant portions of such metrics) may be exposed to clients 350 to enable such customers to monitor their usage of services/items. Control plane may also implement various user and/or customer account functions which may be responsible for updating or maintaining customer/user account information. User information, such as a unique user identifier, may be linked to user account data 332 for customers/users maintained in data store 330.

In some embodiments, control plane 320 may also implement user authentication and access control procedures. For example, for a given network-based request to access a particular content, control plane 320 may be configured to ascertain whether the client 350 associated with the request is authorized to access the particular item. Control plane 320 may determine such authorization by, for example, evaluating an identity, password or other credential against credentials associated with the particular item, or evaluating the requested access to the particular item against an access control list for the particular item. Various access control policies may be stored as records or lists of access control information by control plane 320. In some embodiments, these access control policies may be implemented to accept or deny access to content offered by network-based enterprise 300 (e.g., some or all of streaming videos).

Data store 330 may be one or more storage nodes, systems, or servers configured to persistently store data for enterprise data store, such as the aforementioned user account data 332, group profile data 334, and/or item recommendation data 336 (e.g., an item recommendation model). Various durability and/or security techniques may be implemented to ensure safe and reliable storage of sensitive information, such as payment information, accounts, or passwords.

Item fulfillment 340 may be one or more systems or devices configured to provide selected items to clients 350 that are offered by network-based enterprise 300. In some embodiments, item fulfillment 340 may be application servers, content distribution networks, application, gaming or other media platforms that provide access to or a copy of digital media selected by clients 350. For example, movies, television shows, or other audio/visual media may be streamed or downloaded to clients 350 for consumption as part of a network-based video streaming or gaming service. If access to or rights to an item is limited, item fulfillment 340 may be configured to enforce digital rights management (DRM) or other controls to enforce the policies of the items and their respective offers (e.g., rental or borrow of digital media for certain time periods). Item fulfillment 340 may be also implemented as various physical control systems, handling facilities, and other resources to transport items to customers. Item fulfillment 340 may act as an intermediary with other systems or services to arrange, coordinate, initiate, or otherwise provide items that are services to clients 350.

As illustrated in FIG. 3, user account management 322 may be implemented to manage user account data 322. For example, requests to register identifying devices to a user account may be handled by user account management 322, which updates user account data 332 to create the new mapping. Similarly, new group profiles may be received and stored in group profile data 332, with updates made according to subsequent behavior data store for a group profile. As discussed above with regard to FIG. 1, content recommendation engine 324 may be configured to handle requests for content recommendations to particular user accounts and group profiles based on content user account data 332, group profile data 334, and recommendation data 336 maintained in data store 334. For example, content recommendation data 334 may implement a data model which may accessed and evaluated in order to determine content recommendations to be made for a specific user account. In some embodiments, interface 310 may implement a programmatic interface for item recommendation engine, which may allow third-party applications or other systems, services, or devices to request item recommendations via the programmatic interface from item recommendation engine 324 according to user accounts or a group profile. For example, an application on a mobile device may request restaurant recommendations from item recommendation engine 324 based on a group profile of users (e.g., detected or manually selected) via the programmatic interface and display the common restaurant recommendations at each of the mobile devices of the respective users in the group profile.

Figure 4:
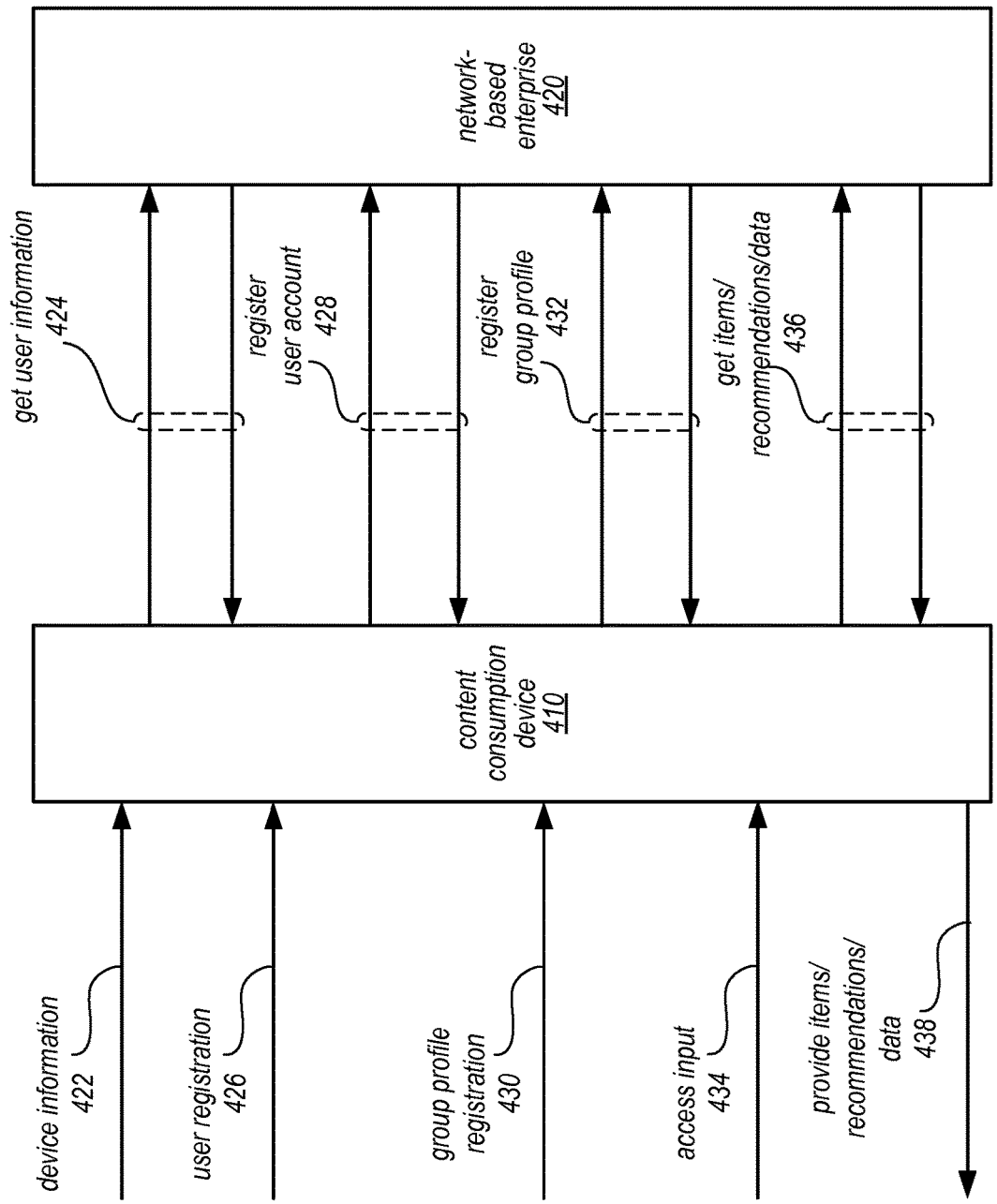
FIG. 4 is a logical block diagram illustrating interactions between a content consumption device and a network-based enterprise, according to some embodiments.

FIG. 4 is a logical block diagram illustrating interactions between a content consumption device and a network-based enterprise, according to some embodiments. As discussed above with regard to FIG. 2, a content consumption device may implement interface(s) to receive the various inputs, indications, requests, and other information illustrated in FIG. 4. In some embodiments, device registration requests may be sent to content consumption device 410 in order to create a link between an identifying device and a user account. In some embodiments, a local data store at content consumption device 410 may be updated to create the link or mapping between the identifying device (e.g., a device identifier) and the user account. As illustrated in FIG. 4, in some embodiments, content consumption device 410 may be configured to send requests to register the identifying device with the user account 424 to network-based enterprise 420.

Figure 5:
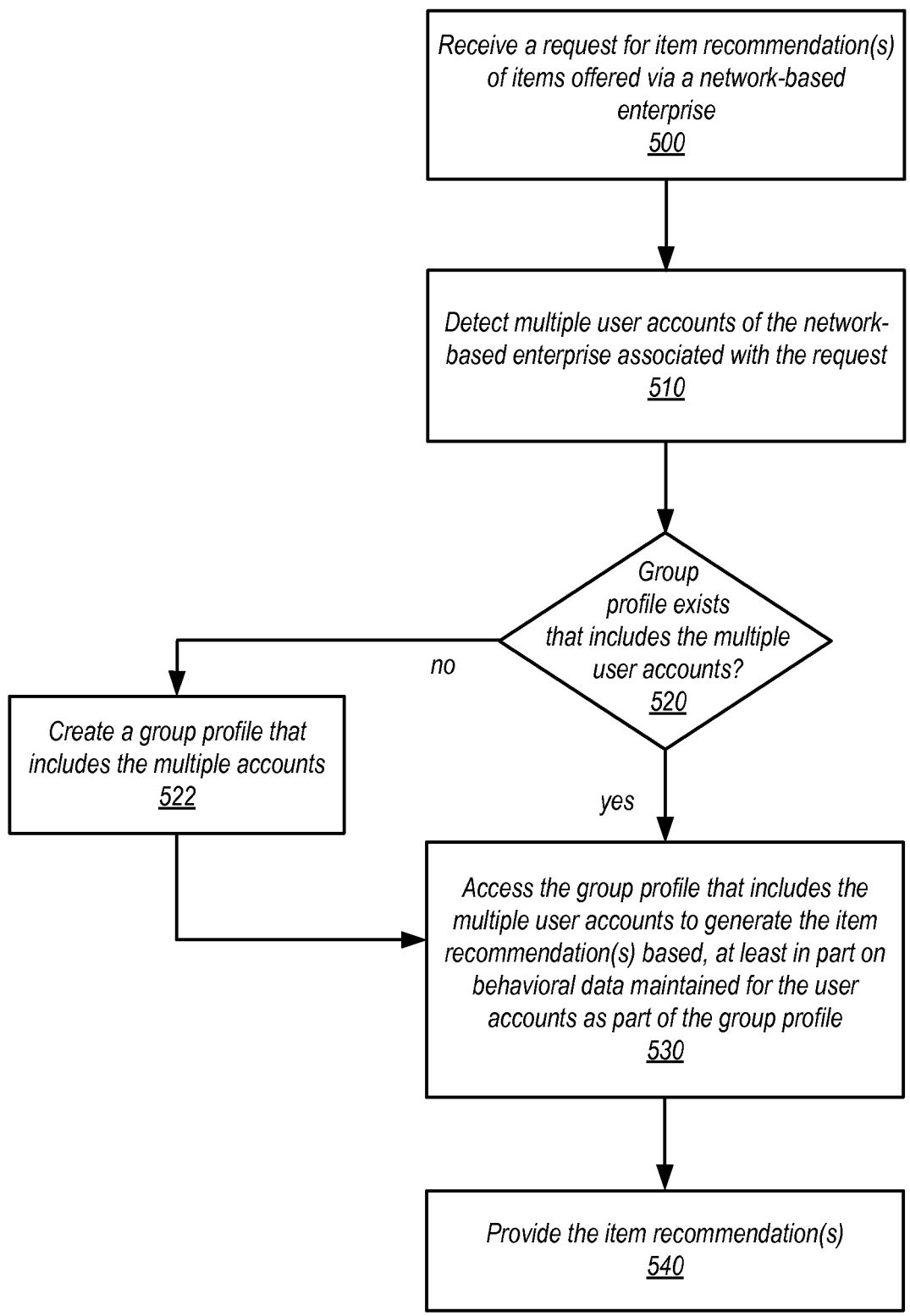
FIG. 5 is a high-level flowchart illustrating methods and techniques for implementing group profiles for group item recommendations, according to some embodiments.

As discussed above with regard to FIGS. 1-2, and below with regard to FIGS. 5-6, device information may be received at content consumption device via one or more wireless communications. For example, identifying devices may advertise device information to a surrounding area via BLE and detection enabled content consumption device 410 may receive the device information. Device information 426 may also be received in response to a request for device information sent from content consumption device 410 (not illustrated). A determination may be made as to whether an identifying device is within consumption proximity of content consumption device 410. If an identifying device is within consumption proximity, then a user account linked to the identifying device may be selected. In some embodiments, the link or mapping information may be stored locally at content consumption device. In some embodiments, as illustrated in FIG. 4, content consumption device 410 may get user information 428 from network-based enterprise 420 to identify and select a linked user account. For example the request may include an identifier unique to the identifying device and request user account information for user accounts linked to the identifier. Similarly, a new group profile may be created or registered 430 at content consumption device. Content consumption device 410 may register this group profile with network-based enterprise 420.

Content access input 434 may be received at content consumption device 410, in some embodiments. Content access input 434 may be various kinds of input to access content via content consumption device 410. For example, the access input may be to activate or turn on content consumption device (e.g., device 410 may handle device information 426 and request user information 428 while in an inactive state, in some embodiments). The access input may be to select items, browse items, query items, or request items recommendations. In order to handle the various content access input 434, content consumption device 410 may access a local store of data maintaining account specific data for the user accounts or group profiles (e.g., account settings, privileges, controls, behavioral history, etc.) to perform various actions, such as changing account settings, or generating content recommendations for user accounts or group profiles. In some embodiments, items, recommendations, and/or data 436 may be requested and received from network-based enterprise 420 in order to provide items, recommendations, and/or account-specific data 438 to a user or group of users, as described below.

The various embodiments of a content consumption device and/or a network-based service implementing group profiles for group recommendations described above with regard to FIGS. 2-4 above, may implement one or more different techniques described below with regard to FIGS. 5-6. However, various other kinds of content consumption devices, or systems may implement group profiles for group recommendations. For example, a content consumption device may maintain local data stores to maintain user account data, group profiles, and/or items. FIG. 5 is a high-level flowchart illustrating methods and techniques for implementing group profiles for group item recommendations, according to some embodiments. Different combinations of systems and/or devices may implement the various techniques discussed below.

As indicated at 500, a request for item recommendation(s) of items offered via a network-based enterprise may be received, in various embodiments. For example, the request may be received as part of an API call to a network-based service, or a call to particular device, such as a content consumption device. As indicated at 510, multiple different user accounts of the network-based enterprise may be detected that are associated with the request. For example, the request may be for content recommendations to be accessed at a content consumption device. The detected user accounts may have users present at the content consumption device (e.g., in the same room). They may be identified according to automatic techniques, such as the device-enabled identification techniques described below. Voice recognition or camera recognition techniques may be implemented in some embodiments. User accounts may also be manually entered via an interface, in some embodiments. The request may be from third party applications, devices, systems, or services which provide item recommendations. In some embodiments, the request may be associated with a particular group profile, which in turn may be used to detect the user accounts associated with the request. For example, a request to a network-based enterprise interface to obtain group recommendations that may be used to purchase an item for a user associated with another user account in the group (e.g., as a gift) may identify the group profile so that recommendations related to the group (including the targeted user) may be generated.

As indicated at 520, it may be determined whether a group profile exists that includes the detected user accounts. If no group profile exists, as indicated by the negative exit form 520, then a group profile may be created, as indicated at 522. For example, a user account data store may be updated to include a new group profile entry, identifying the detected user accounts. Other data, such as behavioral data of the detected user accounts may be associated or maintained as part of the newly created group profile, in some embodiments.

If a group profile exists that includes the multiple user accounts, as indicated at 520 (e.g., by search a group profile membership index or other set of mapping information), then the identified group profile may be accessed, as indicated at 530. Item recommendations may be generated based, at least in part on behavioral data maintained for the user accounts as part of the group profile. For example, common purchases or interests may be used to identify other item recommendation. Generating item recommendations may, in some embodiments, involve filtering requests according restrictions, settings, or other information for one or more multiple user accounts in a group profile. For example, item recommendations may be generated to meet parental safety restrictions placed on certain mature content. Item recommendations may also be based on behavioral data associated with the group profile as a whole. For instance, every the multiple users are detected and the group profile is used to provide access to content or to purchase items, then corresponding behavioral data for actions undertaken while in the group profile may be stored for subsequent item recommendation analysis.

As indicated at 540, once the item recommendations are generated, the item recommendations may be provided, in some embodiments. For example, the item recommendations may be displayed on a network-site (e.g., a recommended items section of a web page) or displayed as part of an interface for a content consumption device.

Figure 6:
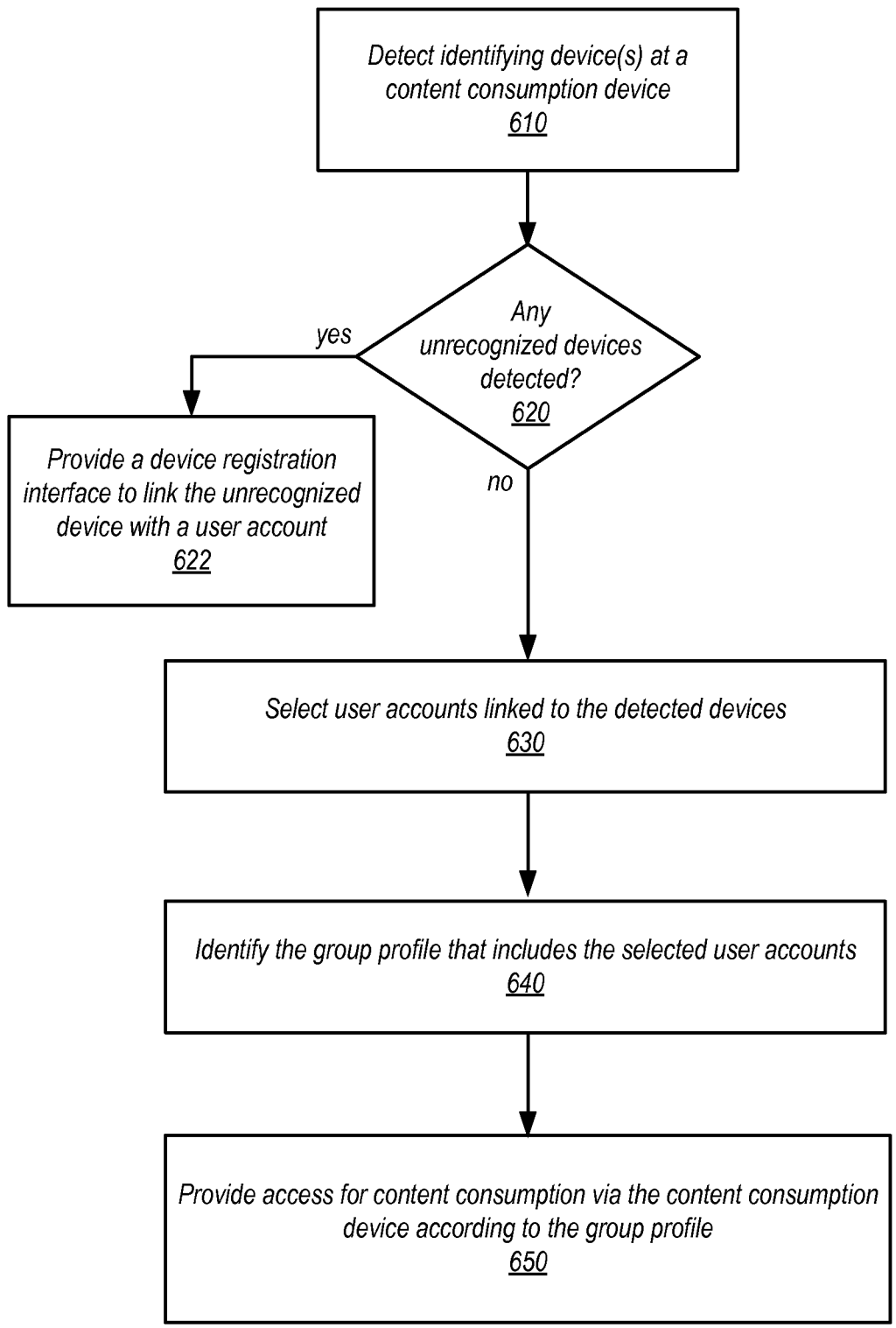
FIG. 6 is a high-level flowchart illustrating methods and techniques for group content recommendations and access at a content consumption device according to a group profile, according to some embodiments.

FIG. 6 is a high-level flowchart illustrating methods and techniques for group content recommendations and access at a content consumption device according to a group profile, according to some embodiments. An identifying device may be detected at a content consumption device, in various embodiments. Identifying devices may act as a proxy for the presence of a user/owner/operator/possessor of the identifying devices. An identifying device may be any mobile computing device, wearable computing device, or other device capable of communicating device information that may be wirelessly received at a content consumption device. For example, an identifying device may be a mobile phone, a tablet computer, laptop or smartwatch configured to actively broadcast device information. In some embodiments, an identifying device may not be active, but may passively provide device information (e.g., in response to a request signal or other communication from a content consumption device). For example, passive Radio Frequency Identification (RFID) tags may be embedded or implemented on various items which may be carried by user (e.g., credit cards with embedded RFID tags).

In at least some embodiments, device information may be received at a content consumption device via one or more wireless communications from an identifying device. For example, various types of radio wave communication protocols and techniques (e.g., Bluetooth, Bluetooth Low Energy (BLE), Z-Wave, ZigBee, XBee), infrared communications, Wi-Fi communications, or any other Wireless Personal Area Network (WPAN) communications may be utilized to provide device information between identifying devices and a content consumption device. Identifying devices may, in some embodiments, be configured to broadcast device information (e.g., an application or component implemented on an identifying device may be configured to proactively advertise the device over wireless communication protocols), or provide device information in response to requests from a content consumption device. In at least some embodiments, proximity sensing may be performed based upon the device information to determine a distance between a content consumption device and an identifying device. For example, signal strength of device information communicated between the content consumption device and the identifying device may be measured to determine the distance (e.g., a Received Signal Strength Indicator (RSSI) value).

For unrecognized devices that are detected within consumption proximity to a content consumption device, an interface may be provided for device registration to link the unrecognized device with a user account, as indicated at 622. For example, a display or other output device may request a user account name and/or password to register or link the detected device with a user account. In some embodiments, the identifying device itself may be directed to provide or display the user account registration interface (e.g., on a mobile phone display).

Selection of a user accounts linked to the identifying devices may be made, as indicated at 630. For example, if only a single user account is linked to the identifying device, then the single user account may be automatically selected. In this way, identifying devices that are personal or unique to a particular user may provide automated user account selection at a content consumption device. Once selected, a group profile including the selected user accounts may be identified, as indicated at 640. Access to content via the content consumption device may then be provided according to the identified user account, as indicated at 550. For instance, access privileges, content restrictions, payment information, historical content access data, and other information specific to user accounts in the group profile may be utilized/enforced to provide content access. In at least some embodiments, content recommendations (e.g., video recommendations, game recommendations, application recommendations, or audio recommendations) may be provided via the content consumption device (e.g., visually or audibly presented) based on historical behavior data, as discussed above with regard to FIG. 5. In some embodiments, some content may be blocked, or otherwise prevented from access, according content controls or settings specific to the group profile. For example, parental controls may impose content rating limitations to block user accounts or group profiles that include them for minor users (e.g., preventing them from accessing mature content).

In some embodiments, the techniques described above with regard to FIG. 5 may be implemented to proactively configure a content consumption device when a group profile is identified within consumption proximity, even if the content consumption device is not actively being utilized. For example, the identified group profile may be preloaded onto the content consumption device so that when the content consumption device is activated, user experience may be provided that is already specific to the selected group profile.

The methods described herein may in various embodiments be implemented by any combination of hardware and software. For example, in one embodiment, the methods may be implemented by a computer system (e.g., a computer system as in FIG. 7) that includes one or more processors executing program instructions stored on a computer-readable storage medium coupled to the processors. The program instructions may be configured to implement the functionality described herein (e.g., the functionality of recommendation engines, model generation components, data stores and/or other components that implement the network-based enterprises, systems, or services described herein). The various methods as illustrated in the figures and described herein represent example embodiments of methods. The order of any method may be changed, and various elements may be added, reordered, combined, omitted, modified, etc.

Figure 7:
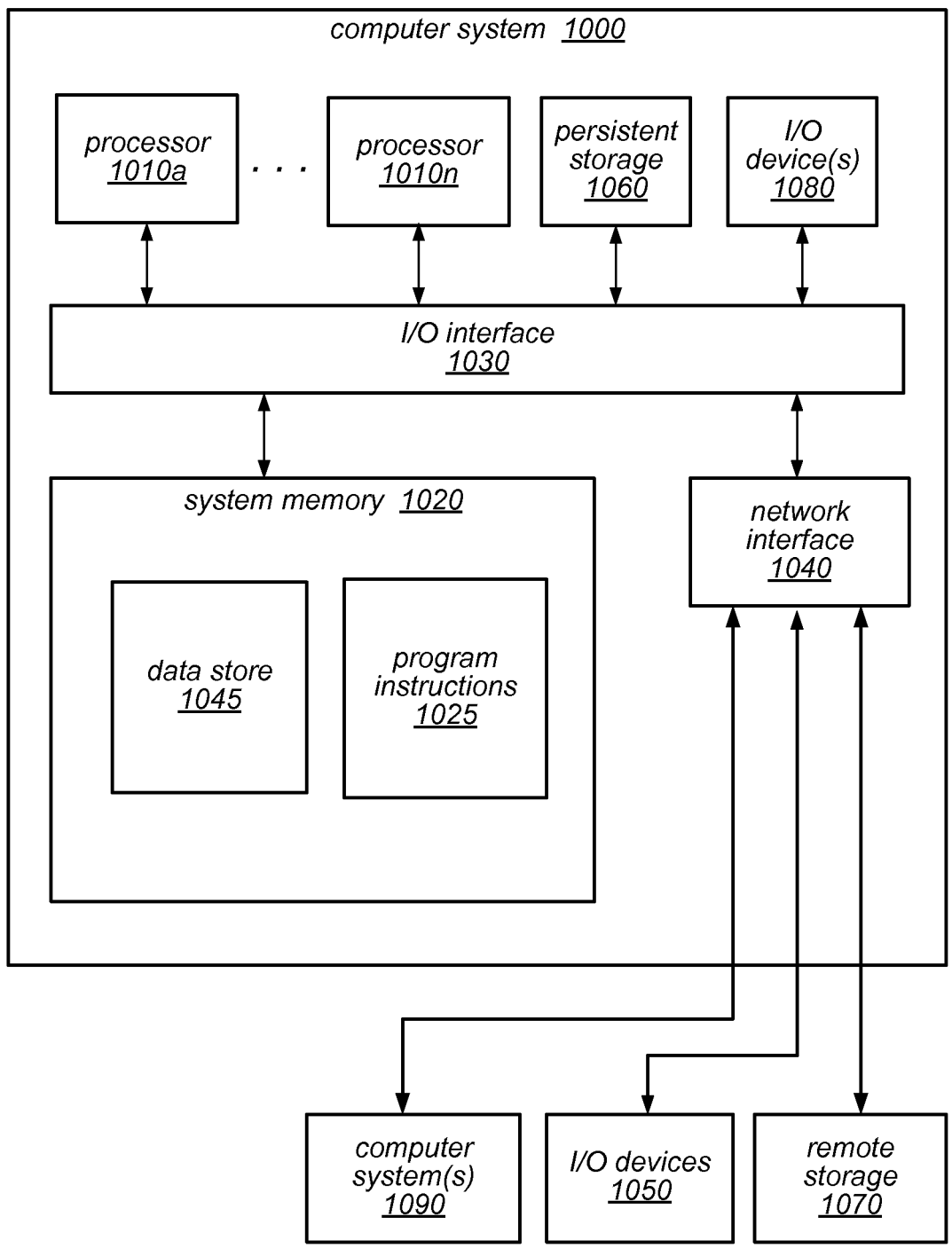
FIG. 7 is an example computer system, according to various embodiments.

FIG. 7 is a block diagram illustrating a computer system configured to implement group profiles for group item recommendations, according to various embodiments. For example, computer system 1000 may be configured to implement a content consumption device and/or a network-based service, in different embodiments. Computer system 1000 may be any of various types of devices, including, but not limited to, a personal computer system, desktop computer, laptop or notebook computer, mainframe computer system, handheld computer, workstation, network computer, a consumer device, application server, storage device, telephone, mobile telephone, or in general any type of computing device.

Computer system 1000 includes one or more processors 1010 (any of which may include multiple cores, which may be single or multi-threaded) coupled to a system memory 1020 via an input/output (I/O) interface 1030. Computer system 1000 further includes a network interface 1040 coupled to I/O interface 1030. In various embodiments, computer system 1000 may be a uniprocessor system including one processor 1010, or a multiprocessor system including several processors 1010 (e.g., two, four, eight, or another suitable number). Processors 1010 may be any suitable processors capable of executing instructions. For example, in various embodiments, processors 1010 may be general-purpose or embedded processors implementing any of a variety of instruction set architectures (ISAs), such as the x86, PowerPC, SPARC, or MIPS ISAs, or any other suitable ISA. In multiprocessor systems, each of processors 1010 may commonly, but not necessarily, implement the same ISA. The computer system 1000 also includes one or more network communication devices (e.g., network interface 1040) for communicating with other systems and/or components over a communications network (e.g. Internet, LAN, etc.). For example, a client application executing on system 1000 may use network interface 1040 to communicate with a server application executing on a single server or on a cluster of servers that implement one or more of the components of the database systems described herein. In another example, an instance of a server application executing on computer system 1000 may use network interface 1040 to communicate with other instances of the server application (or another server application) that may be implemented on other computer systems (e.g., computer systems 1090).

In the illustrated embodiment, computer system 1000 also includes one or more persistent storage devices 1060 and/or one or more I/O devices 1080. In various embodiments, persistent storage devices 1060 may correspond to disk drives, tape drives, solid state memory, other mass storage devices, or any other persistent storage device. Computer system 1000 (or a distributed application or operating system operating thereon) may store instructions and/or data in persistent storage devices 1060, as desired, and may retrieve the stored instruction and/or data as needed. For example, in some embodiments, computer system 1000 may host a storage system server node, and persistent storage 1060 may include the SSDs attached to that server node.

Computer system 1000 includes one or more system memories 1020 that are configured to store instructions and data accessible by processor(s) 1010. In various embodiments, system memories 1020 may be implemented using any suitable memory technology, (e.g., one or more of cache, static random access memory (SRAM), DRAM, RDRAM, EDO RAM, DDR 10 RAM, synchronous dynamic RAM (SDRAM), Rambus RAM, EEPROM, non-volatile/Flash-type memory, or any other type of memory). System memory 1020 may contain program instructions 1025 that are executable by processor(s) 1010 to implement the methods and techniques described herein. In various embodiments, program instructions 1025 may be encoded in platform native binary, any interpreted language such as Java™ byte-code, or in any other language such as C/C++, Java™, etc., or in any combination thereof. For example, in the illustrated embodiment, program instructions 1025 include program instructions executable to implement the functionality of a real-time item recommendation engine (or module or component thereof), one or more computing systems, servers or nodes implementing a network-based enterprise, or storage systems that store the item selection data and/or the item recommendation model, in different embodiments. In some embodiments, program instructions 1025 may implement multiple separate clients, server nodes, and/or other components.

In some embodiments, program instructions 1025 may include instructions executable to implement an operating system (not shown), which may be any of various operating systems, such as UNIX, LINUX, Solaris™, MacOS™, Windows™, etc. Any or all of program instructions 1025 may be provided as a computer program product, or software, that may include a non-transitory computer-readable storage medium having stored thereon instructions, which may be used to program a computer system (or other electronic devices) to perform a process according to various embodiments. A non-transitory computer-readable storage medium may include any mechanism for storing information in a form (e.g., software, processing application) readable by a machine (e.g., a computer). Generally speaking, a non-transitory computer-accessible medium may include computer-readable storage media or memory media such as magnetic or optical media, e.g., disk or DVD/CD-ROM coupled to computer system 1000 via I/O interface 1030. A non-transitory computer-readable storage medium may also include any volatile or non-volatile media such as RAM (e.g. SDRAM, DDR SDRAM, RDRAM, SRAM, etc.), ROM, etc., that may be included in some embodiments of computer system 1000 as system memory 1020 or another type of memory. In other embodiments, program instructions may be communicated using optical, acoustical or other form of propagated signal (e.g., carrier waves, infrared signals, digital signals, etc.) conveyed via a communication medium such as a network and/or a wireless link, such as may be implemented via network interface 1040.

In some embodiments, system memory 1020 may include data store 1045, which may be configured as described herein. For example, the information described herein as being stored by persistent storage, such as the item selection data or the item recommendation model described herein may be stored in data store 1045 or in another portion of system memory 1020 on one or more nodes, in persistent storage 1060, and/or on one or more remote storage devices 1070, at different times and in various embodiments. In general, system memory 1020 (e.g., data store 1045 within system memory 1020), persistent storage 1060, and/or remote storage 1070 may store data blocks, replicas of data blocks, metadata associated with data blocks and/or their state, data storage configuration information, and/or any other information usable in implementing the methods and techniques described herein.

In one embodiment, I/O interface 1030 may be configured to coordinate I/O traffic between processor 1010, system memory 1020 and any peripheral devices in the system, including through network interface 1040 or other peripheral interfaces. In some embodiments, I/O interface 1030 may perform any necessary protocol, timing or other data transformations to convert data signals from one component (e.g., system memory 1020) into a format suitable for use by another component (e.g., processor 1010). In some embodiments, I/O interface 1030 may include support for devices attached through various types of peripheral buses, such as a variant of the Peripheral Component Interconnect (PCI) bus standard or the Universal Serial Bus (USB) standard, for example. In some embodiments, the function of I/O interface 1030 may be split into two or more separate components, such as a north bridge and a south bridge, for example. Also, in some embodiments, some or all of the functionality of I/O interface 1030, such as an interface to system memory 1020, may be incorporated directly into processor 1010.

Network interface 1040 may be configured to allow data to be exchanged between computer system 1000 and other devices attached to a network, such as other computer systems 1090 (which may implement one or more storage system server nodes, enterprise system nodes, and/or clients of the network-based enterprise systems described herein), for example. In addition, network interface 1040 may be configured to allow communication between computer system 1000 and various I/O devices 1050 and/or remote storage 1070. Input/output devices 1050 may, in some embodiments, include one or more display terminals, keyboards, keypads, touchpads, scanning devices, voice or optical recognition devices, or any other devices suitable for entering or retrieving data by one or more computer systems 1000. Multiple input/output devices 1050 may be present in computer system 1000 or may be distributed on various nodes of a distributed system that includes computer system 1000. In some embodiments, similar input/output devices may be separate from computer system 1000 and may interact with one or more nodes of a distributed system that includes computer system 1000 through a wired or wireless connection, such as over network interface 1040. Network interface 1040 may commonly support one or more wireless networking protocols (e.g., Wi-Fi/IEEE 802.11, or another wireless networking standard). However, in various embodiments, network interface 1040 may support communication via any suitable wired or wireless general data networks, such as other types of Ethernet networks, for example. Additionally, network interface 1040 may support communication via telecommunications/telephony networks such as analog voice networks or digital fiber communications networks, via storage area networks such as Fibre Channel SANs, or via any other suitable type of network and/or protocol. In various embodiments, computer system 1000 may include more, fewer, or different components than those illustrated in FIG. 10 (e.g., displays, video cards, audio cards, peripheral devices, other network interfaces such as an ATM interface, an Ethernet interface, a Frame Relay interface, etc.)

It is noted that any of the system embodiments described herein, or any of their components, may be implemented as one or more network-based services, which may or may not be distributed. For example, an item recommendation may be implemented at a network-based enterprise that employs the systems described herein to clients as network-based services. In some embodiments, a network-based service may be implemented by a software and/or hardware system designed to support interoperable machine-to-machine interaction over a network. A network-based service may have an interface described in a machine-processable format, such as the Web Services Description Language (WSDL). Other systems may interact with the network-based service in a manner prescribed by the description of the network-based service's interface. For example, the network-based service may define various operations that other systems may invoke, and may define a particular application programming interface (API) to which other systems may be expected to conform when requesting the various operations. though In various embodiments, a network-based service may be requested or invoked through the use of a message that includes parameters and/or data associated with the network-based services request. Such a message may be formatted according to a particular markup language such as Extensible Markup Language (XML), and/or may be encapsulated using a protocol such as Simple Object Access Protocol (SOAP). To perform a network-based services request, a network-based services client may assemble a message including the request and convey the message to an addressable endpoint (e.g., a Uniform Resource Locator (URL)) corresponding to the network-based service, using an Internet-based application layer transfer protocol such as Hypertext Transfer Protocol (HTTP).

In some embodiments, network-based services may be implemented using Representational State Transfer ("RESTful") techniques rather than message-based techniques. For example, a network-based service implemented according to a RESTful technique may be invoked through parameters included within an HTTP method such as PUT, GET, or DELETE, rather than encapsulated within a SOAP message.

Although the embodiments above have been described in considerable detail, numerous variations and modifications may be made as would become apparent to those skilled in the art once the above disclosure is fully appreciated. It is intended that the following claims be interpreted to embrace all such modifications and changes and, accordingly, the above description to be regarded in an illustrative rather than a restrictive sense.

What is claimed is:

1. A content consumption device comprising:
one or more hardware processors and memory configured to:
detect a plurality of users or identifying devices within a physical consumption proximity of the content consumption device;
identify a plurality of user accounts, associated with the detected plurality of users or identifying devices within the physical consumption proximity of the content consumption device, for accessing content at the content consumption device;
identify a currently existing group profile comprising a behavior history maintained for the plurality of user accounts as part of the group profile, and corresponding to the identified plurality of user accounts associated with the detected plurality of users or identifying devices within the physical consumption proximity of the content consumption device, wherein the behavior history pertains to behavior associated with the plurality of users or identifying devices when together as a group within the physical consumption proximity of the content consumption device, and wherein the group profile further comprises account data associated with the plurality of user accounts respectively; and
provide access to content via the content consumption device according to the group profile, including at least the behavior history maintained for the identified plurality of user accounts as part of the group profile, wherein the content is different than other content accessible by a user account of the plurality of user accounts.

2. The content consumption device of claim 1, wherein to provide access to content via the content consumption device according to the group profile, the content consumption device is configured to obtain one or more content recommendations generated according to the group profile.

3. The content consumption device of claim 1, wherein the one or more hardware processors and memory are configured to:
identify an additional plurality of user accounts for accessing content at the content consumption device;
determine that no current group profile exists for the additional plurality of user accounts; and
create a new group profile to be maintained for providing access to content via the content consumption device.

4. The content consumption device of claim 1, further comprising:
an interface configured to receive device information via wireless communications from the plurality of identifying devices;
wherein to identify the plurality of user accounts, associated with the detected plurality of users or identifying devices, for accessing content at the content consumption device, the one or more hardware processors and memory are configured to:
use the device information from each of two or more of the plurality of identifying devices to determine a respective user account of the plurality of user accounts that is linked to the respective identifying device.

5. A method, comprising:
performing, by one or more computing devices:
receiving, from a content consumption device, identifying information associated with a plurality of user accounts of a network based enterprise, wherein the identifying information identifies users or devices within a physical consumption proximity of the content consumption device;
receiving a request from the content consumption device for one or more item recommendations;
identifying, based at least in part on the identifying information identifying users or devices within a physical consumption proximity of the content consumption device, the plurality of user accounts associated with the request;
identifying a currently existing group profile corresponding to the identified plurality of user accounts associated with the respective users or devices within the physical consumption proximity of the content consumption device, wherein the currently existing group profile comprises historical behavior data associated with the identified plurality of user accounts, and wherein the historical behavior data pertains to behavior associated with the users or devices when together as a group within the physical consumption proximity of the content consumption device; and
providing the one or more item recommendations generated according to the group profile, including at least the historical behavior data associated with the identified plurality of user accounts, wherein the one or more item recommendations generated according to the group profile are different than other item recommendations generated according to a user account of the plurality of user accounts.

6. The method of claim 5, wherein identifying a group profile corresponding to the plurality of user accounts comprises:
receiving an additional request for one or more item recommendations;
identifying a different plurality of user accounts of the network-based enterprise associated with the additional request;
determining that no current group profile exists for the different plurality of user accounts; and
creating a new group profile corresponding to the different plurality of user accounts to be maintained for subsequent item recommendations.

7. The method of claim 5, wherein identifying the plurality of user accounts of the network-based enterprise associated with the request comprises receiving respective user identification for the plurality of user accounts.

8. The method of claim 5, wherein identifying the plurality of user accounts of the network-based enterprise associated with the request comprises analyzing voice input to match respective voice signatures linked to the plurality of user accounts.

9. The method of claim 5, wherein identifying the plurality of user accounts of the network-based enterprise associated with the request comprises using received identifying information from each of two or more of a plurality of users or user devices to determine a respective user account of the plurality of user accounts that is linked to the respective user or user device.

10. The method of claim 5, wherein at least one of the provided one or more item recommendations is for multi-user interactive content.

11. The method of claim 5, wherein the network-based enterprise is a network-based content service, wherein the request for one or more item recommendations is a request for one or more content recommendations, wherein the plurality of user accounts are detected for accessing content at the content consumption device, and wherein the one or more content recommendations are provided to the content consumption device for accessing the recommended content via the content consumption device.

12. The method of claim 11, further comprising storing content access actions performed via the content consumption device as part of the behavioral data of the group profile.

13. The method of claim 12, further comprising:
identifying that the plurality of user accounts are associated with another request, wherein the plurality of user accounts are identified for accessing content at another content consumption device;
identifying the group profile corresponding to the plurality of user accounts; and
providing the one or more item recommendations generated based, at least in part, on the group profile including the stored content access actions of the behavioral data of the group profile.

14. A non-transitory, computer-readable storage medium, storing program instructions that when executed by one or more computing devices cause the one or more computing devices to implement:
receiving, from a content consumption device, identifying information associated with a plurality of user accounts of a network based enterprise, wherein the identifying information identifies users or devices within a physical consumption proximity of the content consumption device;
receiving a request from the content consumption device for one or more item recommendations;
identifying, based at least in part on the identifying information identifying users or devices within a physical consumption proximity of the content consumption device, the plurality of user accounts associated with the request;
identifying a currently existing group profile corresponding to the identified plurality of user accounts associated with the respective users or devices within the physical consumption proximity of the content consumption device, wherein the currently existing group profile comprises historical behavior data associated with the identified plurality of user accounts, and wherein the historical behavior data pertains to behavior associated with the users or devices when together as a group within the physical consumption proximity of the content consumption device;
accessing the group profile to generate the one or more item recommendations based, at least in part, on the historical behavior data associated with the identified plurality of user accounts; and
providing the one or more item recommendations.

15. The non-transitory, computer-readable storage medium of claim 14, wherein, in identifying the group profile that includes the plurality of user accounts the program instructions cause the one or more computing devices to implement:
receiving an additional request for one or more item recommendations;
identifying a different plurality of user accounts of the network-based enterprise associated with the additional request;
determining that no current group profile exists for the different plurality of user accounts; and
creating a new group profile corresponding to the different plurality of user accounts to be maintained for subsequent item recommendations.

16. The non-transitory, computer-readable storage medium of claim 14, wherein in identifying the plurality of user accounts of the network-based enterprise associated with the request, the program instructions cause the one or more computing devices to implement applying one or more camera recognition techniques to match the plurality of users to captured image data.

17. The non-transitory, computer-readable storage medium of claim 14, wherein the network-based enterprise is a network-based content service, wherein the request for one or more item recommendations is a request for one or more content recommendations, wherein the plurality of user accounts are detected for accessing content at the content consumption device, and wherein the one or more content recommendations are provided to the content consumption device for accessing the recommended content via the content consumption device.

18. The non-transitory, computer-readable storage medium of claim 17, wherein the program instructions cause the one or more computing devices to implement storing content access actions performed via the content consumption device as part of the behavioral data of the group profile.

19. The non-transitory, computer-readable storage medium of claim 17, wherein the respective behavioral data for at least one of the plurality of user accounts is maintained at the content consumption device.

20. The non-transitory, computer-readable storage medium of claim 14, wherein the generation of the one or more item recommendations filters candidate item recommendations according to an item rating restriction enabled for at least one of the plurality of user accounts.

* * * * *